United States Patent [19]

Voykin

[11] 4,143,437

[45] Mar. 13, 1979

[54] ANTI-ROOST DEVICE

[76] Inventor: Andrew N. Voykin, 311 Kenmore Rd., Brandon, Fla. 33511

[21] Appl. No.: 838,817

[22] Filed: Oct. 3, 1977

[51] Int. Cl.² .......................................... B63B 21/52
[52] U.S. Cl. ................... 9/8 R; 119/97 AR
[58] Field of Search ............... 9/8 R, 8.3 R, 8.3 E, 9/400; 114/221 R; 119/52 R, 52 A, 51 FS, 97 R, 97 AR

[56] References Cited

U.S. PATENT DOCUMENTS

| | | | |
|---|---|---|---|
| 1,037,111 | 8/1912 | Bethel | 9/8 R |
| 1,917,371 | 7/1933 | Hill | 119/52 R |
| 2,077,309 | 4/1937 | Carlsson | 403/229 |
| 3,707,736 | 1/1973 | Bass | 9/8.3 R |

Primary Examiner—Trygve M. Blix
Assistant Examiner—Sherman D. Basinger
Attorney, Agent, or Firm—Arthur W. Fisher, III

[57] ABSTRACT

An anti-roost device for use in combination with sea buoys and the like comprising an annular base to support an annularly disposed outer anti-roost member coupled thereto by a plurality of vertically disposed spring-like members together with a plurality of radially extending inner anti-roost elements coupled together at substantially the center thereof on a mounting ring.

6 Claims, 1 Drawing Figure

ANTI-ROOST DEVICE

BACKGROUND OF THE INVENTION

1. Field of the Invention

An anti-roost device for use on sea buoys or the like specifically configured to deter or inhibit birds from alighting on the sea buoy.

2. Description of the Prior Art

Numerous attempts have been made to provide means to prevent birds, chickens or the like from roosting on various structures. More particularly German Nos. (1,890,778) and McCollough No. (1,822,302) show various spinning structures employed as anti-roost devices. Additional examples are found in Keating No. (1,983,613) and Hill No. (1,917,371) which show tipping elements positioned on the upper portion of the protective structure. U.S. Pat. Nos. 1,050,947; 1,610,614; 2,080,672; 2,344,367; 3,691,573 and 3,707,736 show additional examples of anti-roost devices.

Comparison of these prior art patents and that of the subject invention as more fully detailed hereinafter shows the unique anti-roost member and elements were not previously shown nor taught.

SUMMARY OF THE INVENTION

The present invention relates to an anti-roost device for use in combination with sea buoys or the like to prevent or deter birds from alighting on the sea buoy. More specifically, the anti-roost device comprises a base configured to operatively mount on the sea buoy in combination with an anti-roost means coupled thereto by interconnecting support means.

The base comprises an annular ring including a plurality of holding clamps disposed about the periphery thereof to secure the entire anti-roost device to the sea buoy or the like. As envisioned, the plurality of holding clamps may each comprise a substantially U-shaped clip or spring holding element.

The anti-roost means comprises an outer anti-roost member of uneven tension substantially concentric with the annular base together with a plurality of inner anti-roost elements extending radially inward from the outer anti-roost member of uneven tension coupled together at substantially the center thereof by a mounting ring. The mounting ring is substantially concentric with the annular base and outer anti-roost member.

The interconnecting support means comprises a plurality of vertically disposed spring-like members fixedly attached at the lower portion thereof to the annular base and attached to the outer anti-roost member at the upper portion thereof.

In use the anti-roost device is coupled to the upper portion of the sea buoy or the like by means of the holding clamps. As envisioned, the mounting ring accomodates the light or similar projections extending upwardly from the sea buoy. The looseness of the outer member and plurality of radially extending inner elements does not permit a bird to alight thereon and guards the upper portion of the sea buoy from landing thereon. To further facilitate the non-ridged platform or anti-roost means, the spring-like interconnecting support members add further flexibility to the anti-roost means.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
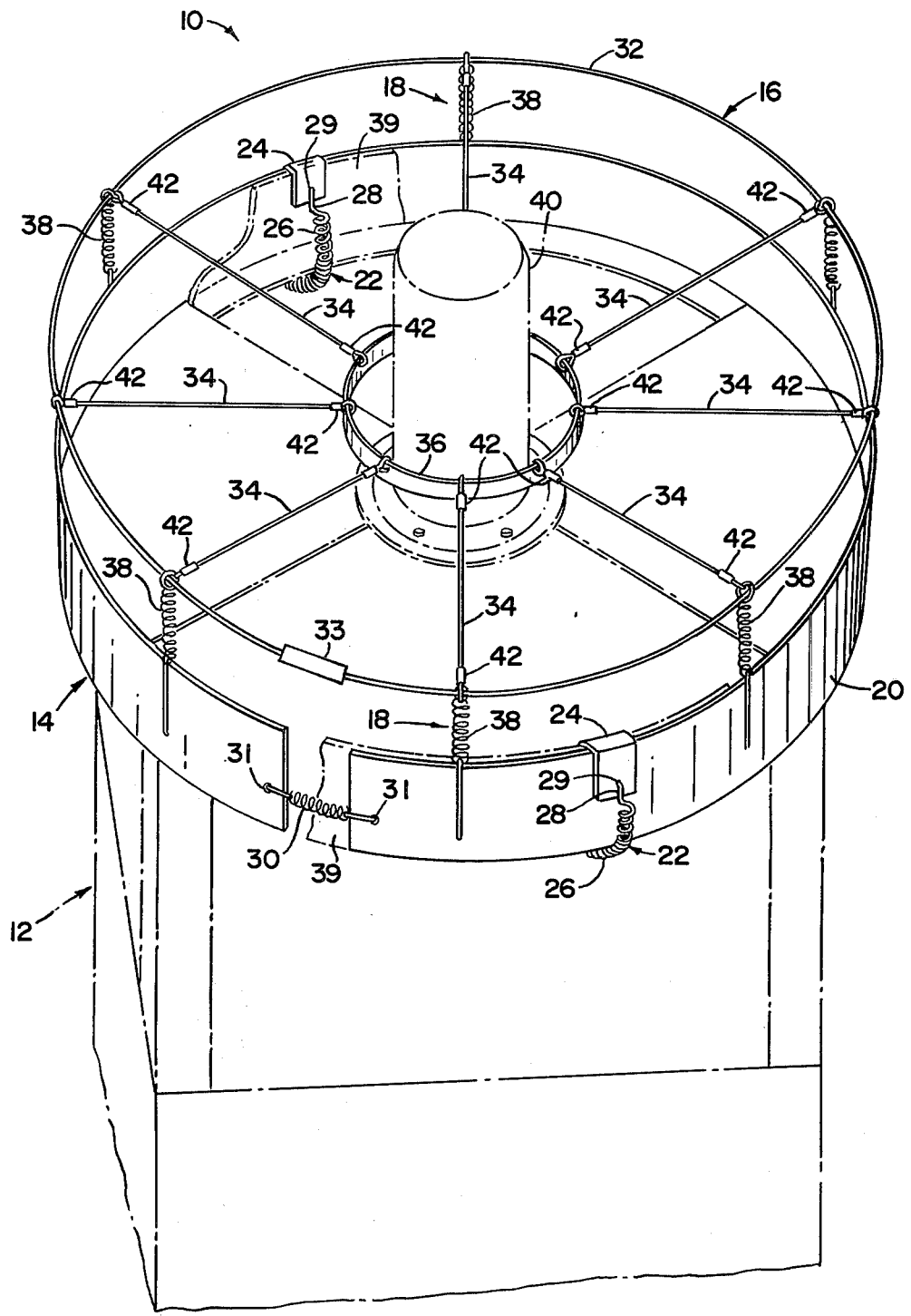
FIG. 1 is a perspective view of the anti-roost device of the present invention.

As shown in FIG. 1, the present invention relates to anti-roost device generally indicated as 10 for use in combination with sea buoys 12 and the like to prevent birds from alighting thereon without injuring the birds and interferring the operations of the sea buoys themselves. More specifically the anti-roost device 10 comprises a base 14, anti-roost means 16 and interconnecting support means 18.

The base 14 comprises an annular ring 20 including a securing means to secure the entire anti-roost device 10 to the sea buoy 12. The securing means comprises a plurality of holding clamps 22 disposed about the periphery of the annular ring 20. As envisioned each holding clamp 22 comprises a substantially U-shaped clip 24, and spring holding element 26 including attachment means 28 at opposite ends thereof to operatively engage apertures 29 formed in clip 24 to secure the device 10 to the sea buoy 12. The annular ring 20 further includes a connecting means 30 such as a spring-like element to operatively engage apertures 31 formed in annular ring 20 to permit limited adjustment of the diameter to accommodate sea buoys 12 of various sizes. As more fully described hereinafter the anti-roost means 16 is interconnected to the annular base 20 by the interconnecting support means 18.

The anti-roost means 16 includes an outer anti-roost member 32. Extending inwardly from the outer anti-roost member 32 are a plurality of inner anti-roost elements 34 coupled at substantially the center thereof by a mounting ring 36. The mounting ring 36 is substantially concentric with the annular ring 20 and outer anti-roost member 32. The anti-roost member 32 and plurality of inner anti-roost elements 34 are thin strands of loose or uneven tension wire or the like. The outer anti-roost member 32 may include an expansion element such as a spring 33 to further increase the instability of the entire anti-roost means 16 as more fully described hereinafter.

The interconnecting support means 18 comprises a plurality of vertically disposed interconnecting elements 38. Each interconnecting element 38 comprises a spring-like member fixedly attached at the lower portion thereof to the base 14 and attached to the outer anti-roost member 32 at the upper portion thereof.

In use the anti-roost device 10 is coupled to the upper portion of the sea buoy 12 or the like by means of the holding clamps 22 extending around the upward rim 39 of the sea buoy 12. As envisioned, the mounting ring 36 accommodates the light 40 or similar projections extending upwardly from the sea buoy 12. The looseness of the outer member 32 and plurality of radially extending inner elements 34 does not permit a bird to alight thereon and guards the upper portion of the sea buoy 12 from landing thereon. To further facilitate the non-rigid platform or anti-roost means 16, the spring-like interconnecting support members 38 add further but limited flexibility to the anti-roost means 16. Clamps 42 are used to secure the inner elements 34 passed through members 38 and folded over on itself. The clamps 42 may be folded at the center or the outer periphery as shown.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An anti-roost device for use in combination with sea buoys and the like comprising a base including securing means formed thereon to attach said anti-roost device to the sea buoy, an anti-roost means comprising an outer anti-roost member and interconnecting support means comprising a plurality of vertically disposed interconnecting elements coupling said outer anti-roost member in spaced relation above said base, said anti-roost means further including a plurality of inner anti-roost elements comprising loose strands extending inwardly from said outer anti-roost member, said inner anti-roost elements coupled at substantially the center thereof to a mounting ring, said mounting ring being substantially concentric with said base and said anti-roost member.

2. The anti-roost device of claim 1 wherein said base comprises an annular ring and said securing means comprises at least one holding clamp disposed on the periphery of said annular ring.

3. The anti-roost device of claim 2 wherein said holding clamp comprises a substantially U-shaped clip and a spring holding member including attachment means to operatively engage said U-shaped clip to secure said anti-roost device to the sea buoy.

4. The anti-roost device of claim 2 wherein said base further comprises a connecting means coupled to opposite ends of said annular ring.

5. The anti-roost device of claim 4 wherein said connecting means comprises a spring-like element attached at the opposite ends thereof to opposite ends of said annular ring.

6. The anti-roost device of claim 1 wherein each said interconnecting element comprises a spring-like member fixedly attached at the lower portion thereof to said base and attached to said outer anti-roost member at the upper portion thereof.

* * * * *